United States Patent
Kanagarajan et al.

(10) Patent No.: US 10,876,857 B1
(45) Date of Patent: Dec. 29, 2020

(54) WAKE VORTEX DISPLAY SYSTEM

(71) Applicant: HONEYWELL INTERNATIONAL INC., Morris Plains, NJ (US)

(72) Inventors: Sivakumar Kanagarajan, Bangalore (IN); Nathan Krishna Moorthy, Bangalore (IN); SunilRaj Suseelan, Bangalore (IN); Sreenivasan Govindillam, Bangalore (IN); Pradeep Huncha, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/668,955

(22) Filed: Oct. 30, 2019

(51) Int. Cl.
*G01M 9/00* (2006.01)
*G01C 23/00* (2006.01)
*B64D 43/00* (2006.01)
*G08G 5/00* (2006.01)
*G06F 3/14* (2006.01)

(52) U.S. Cl.
CPC ............. *G01C 23/00* (2013.01); *B64D 43/00* (2013.01); *G08G 5/0021* (2013.01); *G06F 3/14* (2013.01)

(58) Field of Classification Search
CPC ...... G01C 23/00; B64D 43/00; G08G 5/0021; G06F 3/14
See application file for complete search history.

(56) References Cited

U.S. PATENT DOCUMENTS

| | | | | |
|---|---|---|---|---|
| 5,057,835 A | * | 10/1991 | Factor | G01C 23/00 340/990 |
| 5,845,874 A | * | 12/1998 | Beasley | B64C 23/06 244/1 R |
| 6,177,888 B1 | * | 1/2001 | Cabot | G01C 23/00 340/968 |
| 6,922,631 B1 | * | 7/2005 | Dwyer | G01C 23/00 340/971 |
| 7,471,995 B1 | | 12/2008 | Robinson | |
| 7,640,082 B2 | * | 12/2009 | Dwyer | G01C 23/00 340/945 |
| 8,135,500 B1 | * | 3/2012 | Robinson | G01C 23/00 701/3 |
| 9,709,698 B2 | | 7/2017 | Nykl et al. | |
| 2002/0075171 A1 | * | 6/2002 | Kuntman | G01S 13/933 340/961 |

(Continued)

*Primary Examiner* — Munear T Akki
(74) *Attorney, Agent, or Firm* — Lorenz & Kopf, LLP

(57) ABSTRACT

A system for displaying wake information to a pilot of an ownship aircraft. The system includes a display and a receiver. Aircraft information is received, which includes an aircraft type, position and velocity data and aircraft configuration information for a nearby aircraft. Environmental information is also received. The system includes a processor module configured to generate, using the received aircraft information, a wake volume model for the nearby aircraft; and to modify, and using the received environmental information, the generated wake volume model; and to determine if the modified wake volume model will coincide with the ownship aircraft at a future time. When the processor module determines that the modified wake volume coincides with the ownship aircraft at a future time, the processor module is configured to cause the display to display a representation of the modified wake volume.

20 Claims, 4 Drawing Sheets

(56) References Cited

U.S. PATENT DOCUMENTS

| | | | |
|---|---|---|---|
| 2005/0273220 A1* | 12/2005 | Humbard | G08G 5/025 701/3 |
| 2007/0103340 A1* | 5/2007 | Baranov | G08G 5/00 340/968 |
| 2008/0035784 A1* | 2/2008 | Meserole | G08G 5/0013 244/3.1 |
| 2010/0280753 A1* | 11/2010 | Chytil | G01C 23/00 701/532 |
| 2015/0088342 A1 | 3/2015 | Conner et al. | |
| 2020/0064866 A1* | 2/2020 | Landers | G05D 1/0061 |

\* cited by examiner

WAKE VORTEX DISPLAY SYSTEM

TECHNICAL FIELD

The present disclosure generally relates to systems for displaying avionic information, and more particularly relates to a system for displaying wake vortex information.

BACKGROUND

As an aircraft flies, it generates a wake vortex. This wake vortex generation typically begins when an aircraft leaves the ground on take-off and ends when the aircraft touches down on landing. These wake vortices are generated due to the increase in pressure below the wing and the decrease in pressure above the wing that occurs naturally during flight to generate lift. This differential pressure on either side of the wing causes a "roll" of the airflow proximate to the wings, causing air vortices to form in the aircraft's wake.

A wake vortex generated by an aircraft may present a hazard for other aircraft. In particular, aircraft travelling through the wake vortex volume generated by another aircraft may experience varying degrees of turbulence. In some situations, the turbulence experienced by an aircraft due to these wake vortices may be severe enough to cause a sudden loss of altitude of the aircraft or even cause injury to occupants of the aircraft.

Accordingly, it would be desirable to detect and inform pilots of situations where wake vortex turbulence may be encountered by the aircraft. Other desirable features and characteristics will become apparent from the subsequent detailed description and appended claims.

BRIEF SUMMARY

This summary is provided to introduce a selection of concepts in a simplified form that are further described below in the detailed description section.

In an exemplary embodiment, there is provided a system for displaying wake vortex information to a pilot of an ownship aircraft. The system includes a display and a receiver configured to receive aircraft information about a nearby aircraft. The aircraft information includes an aircraft type, position and velocity data and aircraft configuration information for the nearby aircraft. The receiver is also configured to receive environmental information about the local environment of the ownship aircraft. The system includes a processor module operably connected to the receiver and the display. The processor module is configured to generate, using the received aircraft information, a wake volume model for the nearby aircraft; and to modify, and using the received environmental information, the generated wake volume model. The processor module is further configured to determine if the modified wake volume model will coincide with the ownship aircraft at a future time. When the processor module determines that the modified wake volume coincides with the ownship aircraft at a future time, the processor module is configured to cause the display to display a representation of the modified wake volume.

In another exemplary embodiment, there is provided a system for displaying wake vortex information to a pilot of an ownship aircraft. The system includes a display; and a receiver configured to receive aircraft information about a nearby aircraft. The aircraft information includes an aircraft type, position and velocity data and aircraft configuration information for the nearby aircraft. The receiver is also configured to receive environmental information about the local environment of the ownship aircraft. The system further includes a processor module operably connected to the receiver and the display. The processor module is configured to generate, using the received aircraft information, a wake volume model for the nearby aircraft; and to modify, using the received environmental information, the generated wake volume model. The processor module is further configured to cause the display to display a representation of each modified wake volume.

In another exemplary embodiment, there is provided a method of displaying wake volume information to a pilot of an ownship aircraft. The method includes the step of receiving, with a receiver, aircraft information about a nearby aircraft, the aircraft information comprising an aircraft type, position and velocity data and aircraft configuration information for the nearby aircraft. The method also includes the step of receiving, with a receiver, environmental information about the local environment of the ownship aircraft. The method also includes the step of generating, using a processor, a wake volume model on the basis of the received aircraft information. The method further includes the step of modifying, using the processor, the generated wake volume model on the basis of the received environmental information. The method also includes the step of determining, using the processor, whether the ownship aircraft will coincide with the modified wake volume model at a future point in time. When it is determined that the ownship aircraft will coincide with the modified wake volume model at a future point in time, displaying, using a display, a representation of the modified wake volume model.

Other exemplary embodiments will be made apparent from the detailed description below.

BRIEF DESCRIPTION OF THE DRAWINGS

A more complete understanding of the subject matter may be derived from the following detailed description taken in conjunction with the accompanying drawings, wherein like reference numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the systems and methods defined by the claims. As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. There is no intention to be bound by any expressed or implied theory presented in the preceding Technical Field, Background, Brief Summary or the following Detailed Description.

For the sake of brevity, conventional techniques related to flight planning, communication methods, aircraft controls and associated components may not be described in detail herein. Furthermore, any connecting lines and arrows shown in the various figures contained herein are intended to represent example functional relationships and/or physical couplings between the various elements. It should be noted that many alternative or additional functional relationships or physical connections may be present in an embodiment of the present disclosure.

Embodiments disclosed herein provide systems and methods that allow for information, such as alerts, to be provided to the crew of an ownship aircraft when it is determined that a wake vortex generated by a nearby aircraft may cause turbulence for the ownship aircraft.

Figure 1:
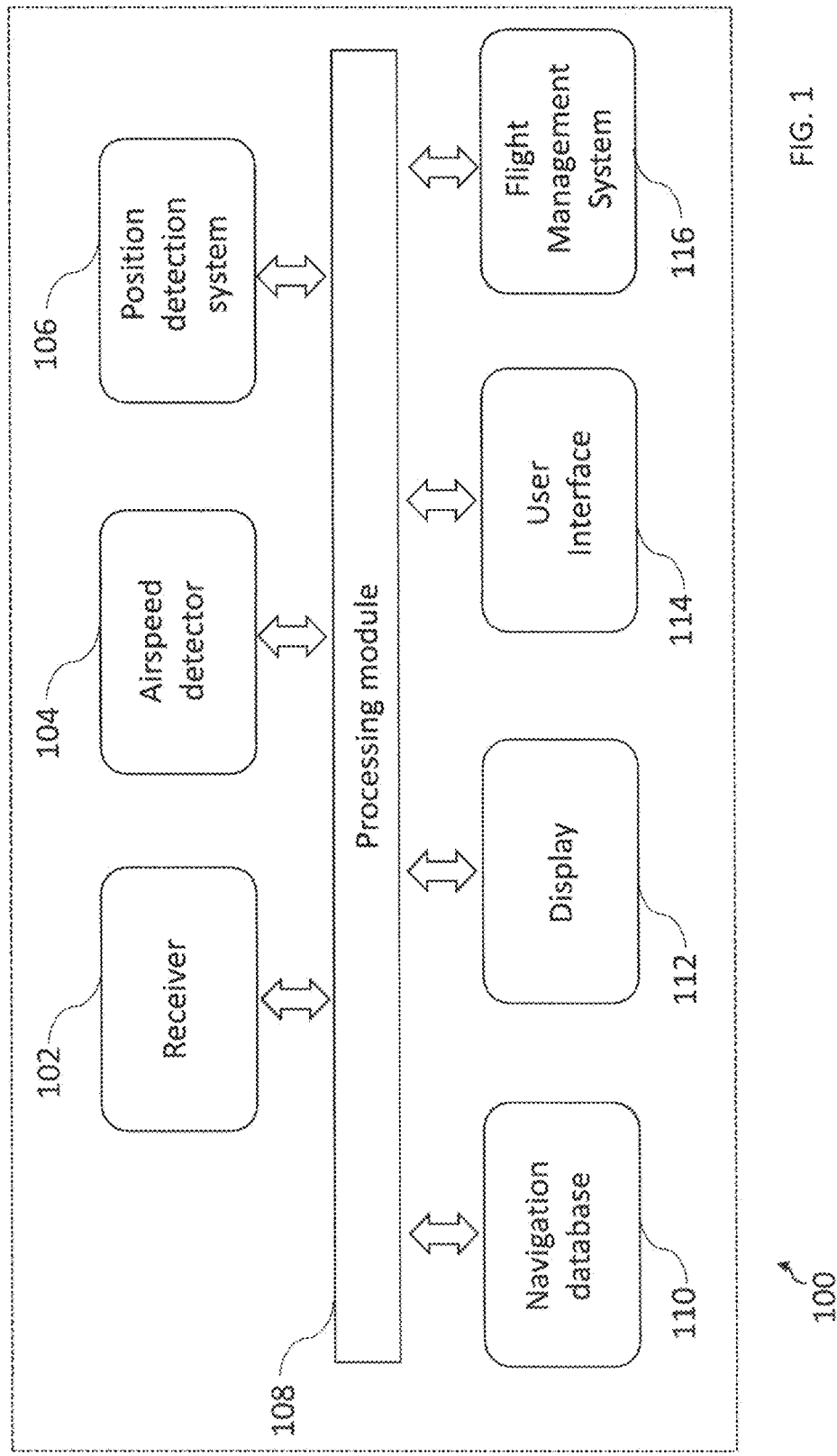
FIG. 1 shows a schematic of a system according to exemplary embodiments.

FIG. 1 shows a functional schematic of a system 100 in accordance with exemplary embodiments. As can be seen in FIG. 1, the system 100 includes a receiver 102. The receiver 102 is configured to receive information relating to environmental information and also to receive aircraft information about aircraft that may be nearby to the ownship aircraft (e.g., "nearby aircraft"). In exemplary embodiments, the receiver comprises a traffic collision avoidance system (TCAS). In alternative exemplary embodiments, the receiver comprises an automatic dependent surveillance-broadcast (ADS-B) receiver. An ADS-B receiver is configured to automatically receive information from nearby aircraft. Advantageously, the information received via ADS-B is generally faster than information received a TCAS receiver (updated information is typically received every second via ADS-B), thereby allowing for more up-to-date information about the local environment and nearby aircraft to be used by the system 100, as will be explained in more detail below. In other words, ADS-B therefore generally allows for the more accurate tracking of other aircraft near to the ownship aircraft.

The environmental information received by the receiver 102 comprises wind speed information, which may be determined by a ground station. In exemplary embodiments, the received environmental information may further include the variation of temperature with altitude in the local environment. Other parameters about the local environment may also be included in the environmental information received at the receiver 102.

The aircraft configuration information received by the receiver 102 is typically received directly from nearby aircraft, for example by the communication protocol "ADS-B IN". The received aircraft information includes position and velocity data of nearby aircraft. In an exemplary embodiment, the aircraft information comprises aircraft type (such as super-heavy, heavy, medium, light and so on) of the nearby aircraft. The aircraft information further includes aircraft configuration information for the nearby aircraft. Aircraft configuration information includes, in various exemplary embodiments, information related to the deployment status of flaps, slats and gears (such as landing gear) of the nearby aircraft. Still further, the aircraft configuration information may include aircraft registration details of the nearby aircraft, which may be used by the system 100 to determine winglet data for the nearby aircraft. In exemplary embodiments, the aircraft configuration information may include the orientation of the nearby aircraft, for example the angle of attack (AoA) of the nearby aircraft. In exemplary embodiments, the aircraft configuration information may include the emission category of the nearby aircraft and/or aircraft capabilities of the nearby aircraft. As explained in more detail below, each of these parameters received in the aircraft configuration information affects the dimensions of the wake volume generated by the nearby aircraft, and thereby affects how severe the wake vortex turbulence is that would be caused if the ownship aircraft were to be incident upon that wake vortex volume.

In exemplary embodiments, the system 100 additionally includes an air speed detector 104 configured to determine the air speed of the ownship aircraft upon which the system 100 is mounted.

In exemplary embodiments, the system 100 further includes a position detection system 106. In exemplary embodiments, the position detection system 106 comprises a Global Positioning System (GPS). The position detection system 106 is configured to determine a current position of the ownship aircraft.

The system 100 further includes a processor module 108 operably coupled to the receiver 102, the airspeed detector 104 and the position sensor 106. The processor module 108 is configured to generate, using the aircraft information about a nearby aircraft received by the receiver from a nearby aircraft, a wake volume model of the wake volume generated by the nearby aircraft. The wake volume model is a geometric model of the expected shape and size of the wake volume generated by the nearby aircraft. The dimensions of the wake volume model are determined by the received aircraft information (such as the velocity, position, and type of the nearby aircraft). The received aircraft information also includes aircraft configuration information (such as the current flap, slat and gear deployment status of the nearby aircraft, the angle of attack of the nearby aircraft, and so on).

It will be appreciated that using the received aircraft configuration information about the nearby aircraft to generate the wake vortex volume model allows for a more accurate wake volume model to be generated by the processor module 108. In particular, if the nearby aircraft has flaps deployed, the pressure differential between the upper and lower sides of the aircraft's wings will be greater and the wake volume generated by the nearby aircraft will therefore be different as compared to the situation where the nearby aircraft's flaps are not deployed. Similarly, the type of winglet mounted on the nearby aircraft will affect the size and shape of the wake volume generated by the nearby aircraft.

The generated wake volume model is time dependent. In other words, the processor module 108 is configured to model how the wake volume model changes over time. For example, in relatively "still" air (with a small environmental wind speed), the wake volume model may descend in altitude at a calculated rate whilst increasing in size at another calculated rate. By modelling the development of segments of the generated wake volume model in an independent manner it is possible to predict how the wake volume model will develop over time, so as to predict the dimensions and boundaries of the wake volume model at a future time.

After generation of the wake volume model using the received aircraft information of the nearby aircraft, which includes aircraft configuration information about the nearby aircraft, the processor module 108 is configured to modify the generated wake volume model on the basis of the received environmental information. More specifically, the processor module 108 is configured to determine, using the received environmental information, how the wake volume model will change over time as a result of the local environmental conditions. For example, as explained above, it can be assumed that a wake volume created by a nearby aircraft will develop in a certain manner in "still" air, such as by "fanning out" behind the nearby aircraft and decreasing in altitude as time progresses. Using this assumption as a base, additional factors may be taken into account to determine how the generated wake volume model will develop based on environmental conditions in the received environmental information. For example, if the received environmental information indicates that a low wind speed is present in the area of the wake volume, the modified wake volume model shape will not be drastically altered by the wind speed as compared to the initially generated wake volume model, and the wake volume model may retain its overall shape as it increases in size and descends. Alternatively, if strong wind speeds are present in the area of the wake volume, the modified wake volume model will be modified so as to dissipate at a faster rate as compared to the initially generated wake volume model. As yet another potential alternative, a crosswind may cause a "shift" in the location of the modified wake volume model as compared to the initially generated wake volume model such that the modified wake volume model no longer lies directly behind the nearby aircraft which created it. At a certain point in time, the processor model 108 may determine that the wake volume model is dissipated in a certain airspace location.

As explained above, it has been noted by the present inventors that the size and shape of the wake volume model initially generated by the nearby aircraft may depend on various factors such as the velocity and aircraft size (heavy, medium, light, and so on) of the nearby aircraft and also on the configuration of the nearby aircraft (such as whether flaps, slats and gears are deployed, the type of winglet on the nearby aircraft, the angle of attack of the nearby aircraft, and so on). Using this additional aircraft configuration information of the nearby aircraft, the processor module 108 can generate and then modify a wake volume model for the nearby aircraft that more closely matches the size and shape of the wake volume actually generated by the nearby aircraft and as modified by the real local environmental conditions. By taking into consideration one or more of these additional pieces of aircraft configuration information of the nearby aircraft, the accuracy of the initial wake volume model as generated by the processor module 108 and the accuracy of the modified wake volume model are both increased.

In exemplary embodiments, the system 100 further includes a navigation database 110 operably coupled to the processor module 108. The navigation database 110 stores a flight plan of the ownship aircraft, which includes information regarding the intended travel path of the ownship aircraft.

The processor module 108 is configured to determine, using the stored flight plan in the navigation database, the velocity and position of the ownship aircraft and the modified wake volume model, whether or not the ownship aircraft will be incident with the modified wake volume model generated by a nearby aircraft at a future point in time.

If the processing module 108 does determine that the ownship aircraft will be incident with the wake volume model at a future point in time, the processor module 108 is configured to convey this information to the pilot of the ownship aircraft, for example by displaying a representation of the wake volume model.

In exemplary embodiments, the system 100 further comprises a display 112 operably coupled to the processor module 108. The display 112 is configured to render text, graphics and/or other types of visual information to the pilot. In various exemplary embodiments, the display device forms part of an aircraft-mounted display (such as the primary flight display, PFD, or a multi-function display, MFD). In alternative embodiments, the display 112 forms part of a head-up display projection, or forms part of a near-to-eye (NTE) display such as a head-mounted display (HMD).

In use, the processor module 108 is configured, upon determining that the ownship aircraft will be incident with the wake volume model generated by a nearby aircraft at a future point in time, to cause the display 112 to display a representation of this wake volume model to the pilot. In exemplary embodiments, a visual warning is additionally displayed to the pilot together with a representation of the wake volume model. By displaying a visual warning to the pilot when it is determined that the ownship aircraft will be incident upon the wake volume model, the pilot is able to take evasive action prior to experiencing wake vortex turbulence without a substantial increase in the pilot's workload. The situational awareness of the pilot is therefore improved through the use of the system 100.

In exemplary embodiments, the system 100 includes a user interface 114 operably coupled to the processor module 108. In various exemplary embodiments, the user interface 114 may comprise an input mechanism (such as a joystick, touchscreen, keyboard, etc.) that allows the pilot to manipulate data in conjunction with the display 112. In exemplary embodiments, the pilot may interact with the user interface 114 to modify data (such as the received aircraft information, received environmental information, or ownship position or velocity information) if the need arises, for example in the event of a faulty sensor.

Figure 2:
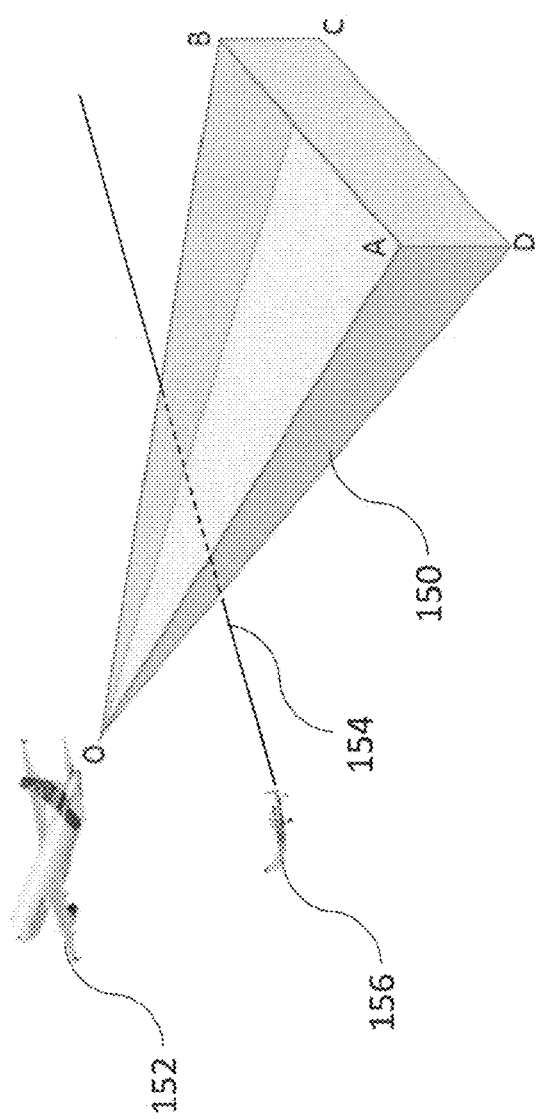
FIG. 2 shows an illustration of a determination made by a processor module according to exemplary embodiments.

A visual representation of the condition to be determined by the processing module 108 is shown in FIG. 2. As shown in FIG. 2, the processor module 108 has generated and subsequently modified, on the basis of received environmental information, a wake volume model 150 caused by a nearby aircraft 152. The modified wake volume model is defined in this example by a geometric representation corresponding to a rectangular-based pyramid with vertices O, A, B, C and D. The processor module 108 is configured to compare the flight plan 154, position and velocity of the ownship aircraft 156 to this wake volume model 150 to determine if, at a future point in time, the ownship aircraft will be incident with the wake volume model 150. In the scenario shown in FIG. 2, it can be seen that the ownship 156 will coincide with the wake volume model 150 at a future point in time. As such, for the scenario shown in FIG. 2, the processor module 108 would display a visual representation of the wake volume mode and/or a visual warning to the pilot of the ownship aircraft 156.

Figure 3:
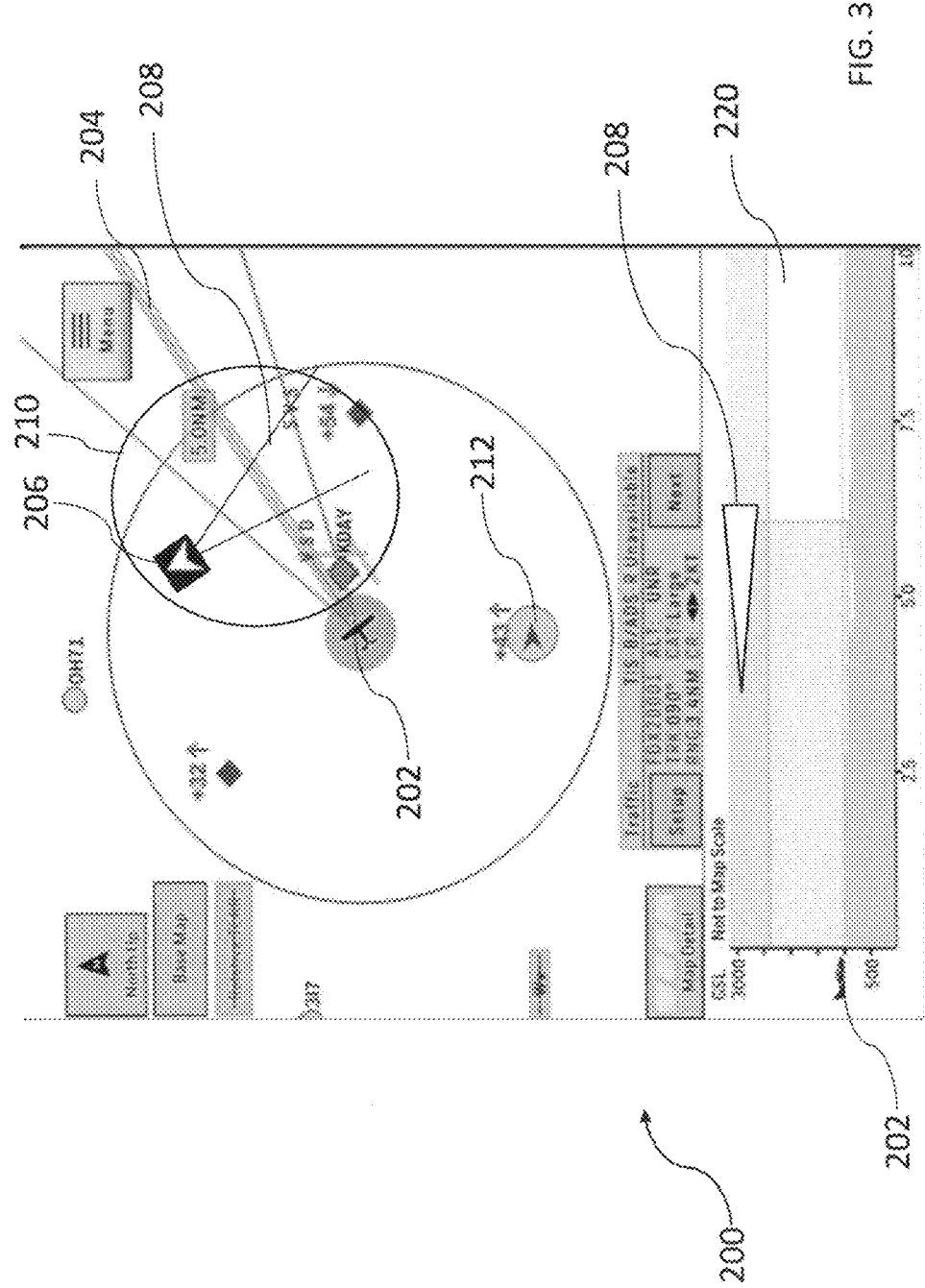
FIG. 3 shows a representation displayed on a display in accordance with exemplary embodiments.

One exemplary embodiment of the information which may be displayed to the pilot on the display 114 is shown in FIG. 3. As can be seen in FIG. 3, the display 114 may display a representation 200 to the pilot. In exemplary embodiments, the representation 200 includes an icon 202 of the ownship aircraft and an icon 204 illustrating the flight plan of the ownship aircraft. The representation 200 further includes an icon 206 showing the position and direction of travel of a nearby aircraft, and another icon 208 indicating the size and shape of the wake volume model generated by the nearby aircraft 206 on the basis of the received aircraft information and environmental information.

As can be seen in FIG. 3, the flight path 204 of the ownship aircraft 202 means that the ownship aircraft will coincide with the wake volume model 208. As such, the processing module 108 displays a visual warning 210 to the pilot to inform them of potential future wake vortex turbulence as a result of this wake volume. In exemplary embodiments, the visual warning 210 comprises an icon drawing attention to the coinciding of the flight plan 204 and the wake volume 208, for example a circle 210 surrounding the location of the coinciding location.

In exemplary embodiments, the visual warning 210 is altered depending on characteristics of the wake volume as determined by the processor model using the received aircraft configuration information and the received environmental information. For example, if the received aircraft configuration information and environmental information indicate that the wake volume 208 may cause severe turbulence for the ownship aircraft (for example, if the nearby aircraft 206 is a "heavy"-type aircraft, or if the nearby aircraft is a "medium"-type aircraft that has deployed flaps, or if the nearby aircraft is a "medium"-type aircraft and the environmental information indicates that a low wind speed is present in the area of coincidence between the ownship aircraft and the wake volume 208), the visual warning 210 may be of a first presentation style. In exemplary embodiments, the first presentation style of the visual warning 210 comprises a first color, for example red, which may indicate a "severe" threat. If the received aircraft configuration information and environmental information indicate that the wake volume 208 may cause moderate turbulence for the ownship aircraft, the visual warning 210 may be of a second presentation style. In exemplary embodiments, the second presentation style of the visual warning 210 comprises a second color, for example yellow, which may indicate a "moderate" threat. If the received aircraft configuration information and environmental information indicate that the wake volume 208 may cause light turbulence for the ownship aircraft, the visual warning 210 may be of a third presentation style. In exemplary embodiments, the second presentation style of the visual warning 210 comprises a third color, for example green, which may indicate a "low-risk" or "no" threat. In embodiments, the determination of the severity of the expected turbulence also depends on the aircraft type (heavy, medium, light etc.) of the ownship aircraft.

By presenting the visual warning 210 to the pilot with different presentation styles depending on the severity of the expected turbulence that will be caused for the ownship aircraft by the wake volume generated by the nearby aircraft, the pilot is more easily able to determine whether or not evasive action should be taken to avoid wake vortex turbulence that would be experienced if the present flight plan 204 is maintained.

As can be seen in FIG. 3, the icon 208 representing the wake volume model for the nearby aircraft 206 is in the form of an open triangle, which illustrates the "fanning out" of the wake volume behind the nearby aircraft. However, in alternative embodiments, other iconography can be used for this icon 208. For example, the icon 208 may be shown using other symbology, such as a series of lines or a geometric shape. Furthermore, in exemplary embodiments, the icon 208 itself may be altered to provide the visual warning 210 to the pilot. For example, the color of the icon 208 itself may turn red to provide a visual warning 210 to the pilot when it is predicted that a certain wake volume will cause heavy turbulence. By incorporating the visual warning 210 into the icon 208 itself, the amount of "clutter" (unnecessary information) presented to the pilot can be reduced.

As can also be seen in FIG. 3, the representation 200 may additionally include icons 212 indicating the positions of other nearby aircraft. The processor module 108 is configured to determine if the wake volumes generated by these other nearby aircraft will coincide with the ownship aircraft, based upon the position, velocity and flight plan of the ownship aircraft. If the wake volumes generated by the other nearby aircraft 212 will not coincide with the ownship aircraft at a future time, these wake volumes are not displayed on the representation 200 so as to reduce the amount of "clutter" presented to the pilot.

In exemplary embodiments, the representation 200 further displays an altitude representation 220 for showing the present altitude of the ownship aircraft 202. In exemplary embodiments, the altitude representation 220 further shows the present altitude of the wake volume 208 generated by the nearby aircraft 206. In particular, as explained above, wake volumes may descend in altitude at a rate dependent upon the variation of temperature with altitude in the local environment. As such, even though the ownship aircraft may presently be at a different altitude to the wake volume 208, by the time the ownship aircraft reaches the location of the wake volume 208, the wake volume 208 may have descended to an altitude so as to coincide with the ownship aircraft at a future time. As such, the displaying of altitude information about the ownship aircraft 202 and wake volumes 208 to the pilot on the altitude representation 220 allows for the pilot to better determine what type of evasive action (if any) should be taken to avoid a wake volume 208. For example, with a comparison of the altitudes of the wake volume 208 that coincides with the flight plan 204 of the ownship aircraft, the pilot may determine that an increase or decrease in altitude is the best way to avoid experiencing turbulence caused by the wake volume 208.

In exemplary embodiments, other navigational aids (such as terrain features, airspace boundaries and/or directional aids) are also incorporated into representation 200.

In an alternative embodiment, the processor module 108 does not take into consideration whether the flight plan 204 coincides with a wake volume generated by a nearby aircraft. In this alternative embodiment, a representation of every wake volume of every nearby aircraft within a predetermined distance of the ownship aircraft is displayed to the pilot. Such a display may be useful to the pilot when no flight plan has been determined, and the pilot is flying without a flight plan. In exemplary embodiments, visual warnings 210 are displayed associated with each one of these wake volumes.

In another alternative embodiment, the pilot is able to select between a mode where the display 112 shows only those wake volumes which will coincide with the ownship aircraft at a future time and a mode where the display 112 shows wake volumes for every nearby aircraft within a predetermined distance.

Returning to FIG. 1, in exemplary embodiments, the system 100 comprises a flight management system 116 operably connected to the processor module 108, the flight management system 116 is configured to determine potential evasive actions for the ownship aircraft to avoid wake volumes. For example, depending on how the modified wake volume model is expected to develop over time based on the received environmental conditions, the flight management system 116 may determine that a decrease in altitude is a potential evasive action that would allow for the wake volume to be avoided by the ownship aircraft. The processor module 108 is then configured to cause the display 112 to display the determined potential evasive action to the pilot. The potential evasive action may be displayed on the representation 200 and also on the altitude information 220.

Figure 4:
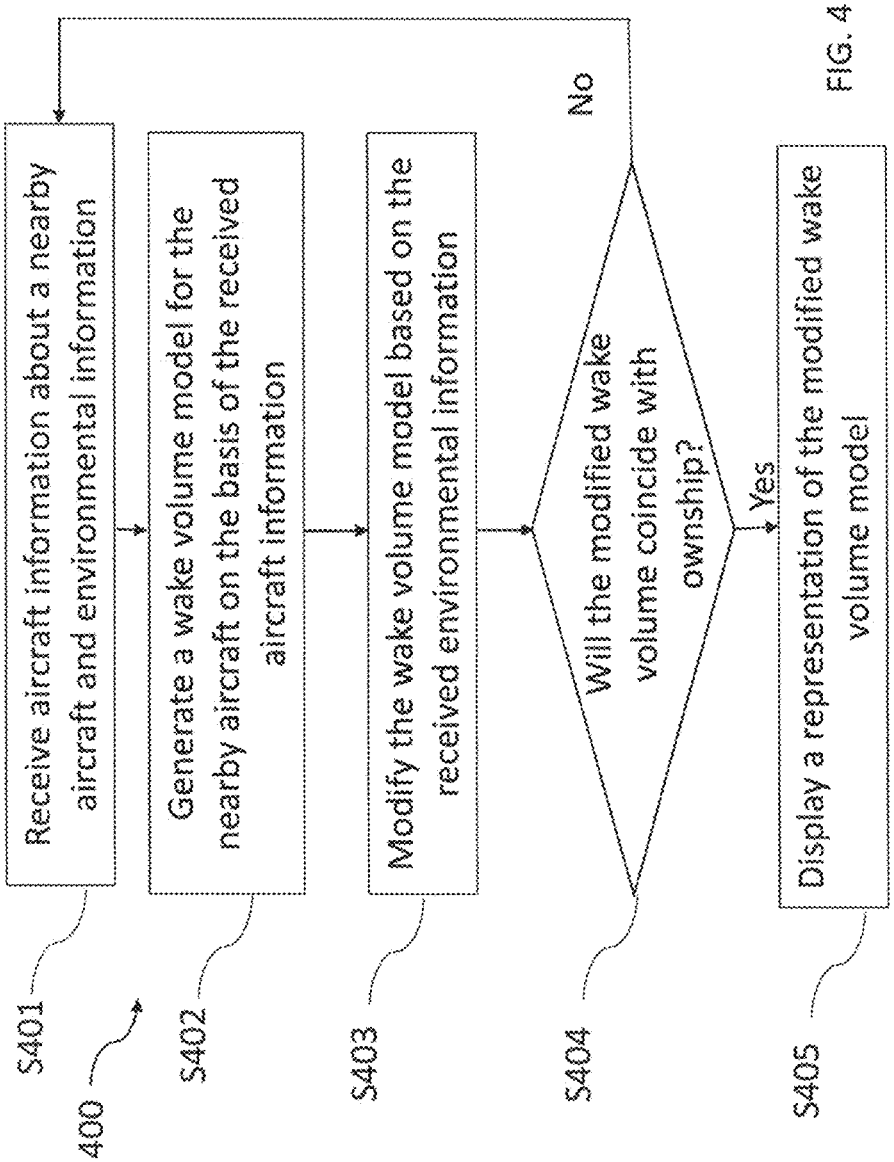
FIG. 4 shows a method in accordance with exemplary embodiments.

A method 400 in accordance with exemplary embodiments is shown in FIG. 4. At step S401, aircraft information about nearby aircraft is received using a receiver. Environmental information about the local environment of the ownship aircraft is also received at the receiver in this step S401. After receipt of the aircraft information and environmental information, the method progresses to step 402.

At step S402, a wake volume model is generated, using a processor module, for the nearby aircraft using the received aircraft information. The dimensions of the wake volume model depend on the aircraft information, such as the nearby aircraft type (heavy, medium, light, and so on) and aircraft configuration information (such as the current flap deployment status of the nearby aircraft, and so on) included in the aircraft information. After generating the wake volume model, the method progresses to step S403.

At step S403, the generated wake volume model is modified, using the processor module, on the basis of the received environmental information. For example, if the received environmental information indicates that a strong cross wind is present, the wake volume is likely to dissipate faster than if a strong cross wind was not present. As such, the wake volume model is modified to take account of this faster dissipation rate. As another example, the descent rate of the wake volume may increase or decrease based on the local temperature variation, which may be included in the received environmental information. As such, the wake volume model may be modified to take into account this increased or decreased descent rate. After modification of the wake volume model using the received environmental information, the method progresses to step S404.

At step S404, it is determined, using the processor module, whether or not the modified wake volume will coincide with the flight plan of the ownship aircraft. In other words, the processor module determines whether, at a future time, whether the location of the ownship aircraft will coincide with the modified wake volume using the flight plan data of the ownship aircraft, the position and velocity of the ownship aircraft and the expected development of the modified wake volume with respect to time. If it is determined that the modified wake volume will not coincide with the location of the ownship aircraft at a future time, the method reverts to step S401. If it is determined that the modified wake volume will coincide with the location of the ownship aircraft at a future time, the method progresses to step S405.

At Step S405, a representation of the modified wake volume is displayed to the pilot so as to inform the pilot that the ownship aircraft may experience wake vortex turbulence due to the nearby aircraft, In exemplary embodiments, a visual warning is provided to the pilot together with the representation of the modified wake volume.

While at least one exemplary embodiment has been presented in the foregoing detailed description, it should be appreciated that a vast number of variations exist. In particular, other techniques of presenting indications to the pilot regarding the color-based information of stored visual references exist, such as audio messages etc. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for displaying wake vortex information to a pilot of an ownship aircraft, the system comprising:
a display;
a receiver configured to receive aircraft information about a nearby aircraft and configured to receive environmental information, the aircraft information comprising aircraft type, position and velocity data and aircraft configuration information for the nearby aircraft; and
a processor module operably connected to the receiver and the display, wherein the processor module is configured to (i) generate a wake volume model for the nearby aircraft using the received aircraft information, (ii) modify the generated wake volume model using the received environmental information, and (iii) determine if the modified wake volume model will coincide with the ownship aircraft at a future time,
wherein, when the processor module determines that the modified wake volume model coincides with the ownship aircraft at the future time, the processor module is configured to cause the display to display a representation of the modified wake volume.

2. The system of claim 1, wherein the environmental information comprises wind speed information.

3. The system of claim 1, wherein the aircraft configuration data comprises one or more of a flap deployment status of the nearby aircraft; a landing gear deployment status of the nearby aircraft, a winglet type of the nearby aircraft, an emission category of the nearby aircraft, and an angle of attack of the nearby aircraft.

4. The system of claim 1, wherein, when the processor module determines that the modified wake volume coincides with the ownship aircraft at the future time, the processor module is configured to cause the display to display a visual warning.

5. The system of claim 4, wherein the processor module is configured to estimate a severity of expected wake volume turbulence based on the modified wake volume model, and wherein, when the modified wake volume model is determined to coincide with the ownship aircraft at the future time, the processor module is configured to modify a presentation style of the visual warning based on the estimated severity.

6. The system of claim 1, further comprising an airspeed detector operably coupled to the processor module, the airspeed detector configured to determine the airspeed of the ownship aircraft.

7. The system of claim 6, further comprising a position detector operably coupled to the processor module, the airspeed detector configured to determine the position of the ownship aircraft.

8. The system of claim 7, further comprising a navigation database operably coupled to the processor module, the navigation database configured to store a flight plan of the ownship aircraft.

9. The system of claim 8, wherein the processor module is configured to determine whether the ownship aircraft will coincide with the modified wake volume model using the airspeed, the position and the flight plan of the ownship aircraft.

10. The system of claim 1, wherein the processor module is configured to cause the display to display altitude information of the ownship and the modified wake volume model.

11. A system for displaying wake information to a pilot of an ownship aircraft, the system comprising:
 a display;
 a receiver configured to receive aircraft information about nearby aircraft and configured to receive environmental information, the aircraft information comprising aircraft type, position and velocity data and aircraft configuration information for the nearby aircraft; and
 a processor module operably connected to the receiver and the display, wherein the processor module is configured to (i) generate a wake volume model for the nearby aircraft using the received aircraft information, (ii) modify the generated wake volume model using the received environmental information, and (iii) determine if the modified wake volume model will coincide with the ownship aircraft at a future time,
 wherein, when the processor module determines that the modified wake volume model coincides with the ownship aircraft at the future time, the processor module is configured to cause the display to display a representation of the modified wake volume model.

12. The system of claim 11, wherein the environmental information comprises wind speed information.

13. The system of claim 11, wherein the aircraft configuration data comprises one or more of a flap deployment status of the nearby aircraft; a landing gear deployment status of the nearby aircraft, a winglet type of the nearby aircraft, an emission category of the nearby aircraft, and an angle of attack of the nearby aircraft.

14. The system of claim 11, wherein the processor module is configured to estimate a severity of expected wake volume turbulence based on the modified wake volume model, and is configured to modify a presentation style of the representation of the modified wake volume model based on the estimated severity.

15. The system of claim 11, wherein the processor module is configured to cause the display to display altitude information of the ownship aircraft and the modified wake volume model.

16. A method of displaying wake volume information to a pilot of an ownship aircraft, the method comprising:
 receiving, with a receiver, aircraft information about nearby aircraft, the aircraft information comprising aircraft type, position and velocity data and aircraft configuration information for the nearby aircraft;
 receiving, with a receiver, environmental information about the local environment;
 generating, using a processor module, a wake volume model on the basis of the received aircraft information;
 modifying, using the processor module, the generated wake volume model on the basis of the received environmental information;
 determining, using the processor module, whether the ownship aircraft will coincide with the modified wake volume model at a future point in time; and
 when it is determined that the ownship aircraft will coincide with the modified wake volume model at the future point in time, displaying, using a display, a representation of the modified wake volume model.

17. The method of claim 16, wherein the environmental information comprises wind speed information.

18. The method of claim 16, wherein the aircraft configuration information comprises one or more of a flap deployment status of the nearby aircraft; a landing gear deployment status of the nearby aircraft, a winglet type of the nearby aircraft, an emission category of the nearby aircraft, and the angle of attack of the nearby aircraft.

19. The method of claim 16, wherein, when it is determined that the modified wake volume model will coincide with the ownship aircraft at the future time, a visual warning is displayed on the display.

20. The method of claim 19, further comprising the step of estimating a severity of expected wake volume turbulence based on the modified wake volume model and modifying a presentation style of the visual warning based on the estimated severity.

* * * * *